May 8, 1945.  W. STELZER  2,375,392
BRAKE
Filed Jan. 16, 1943
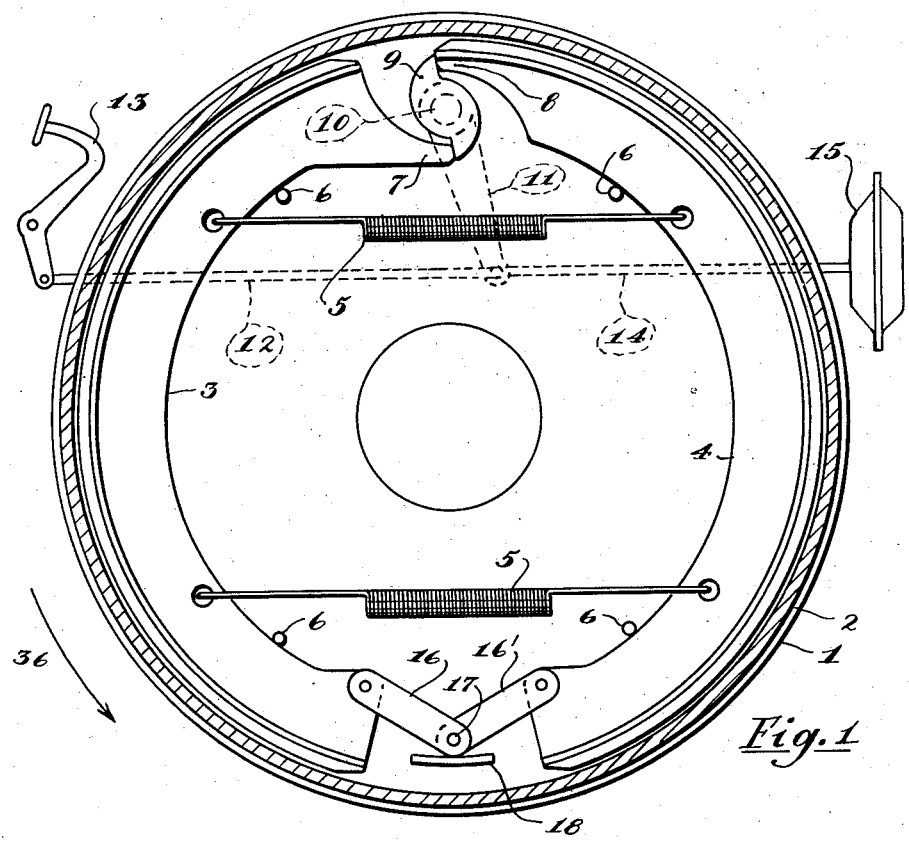
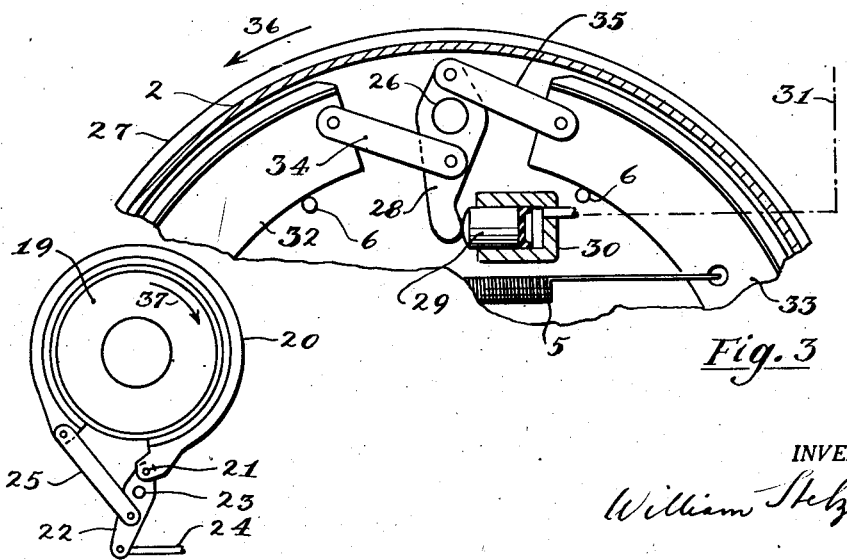
Fig. 1
Fig. 2
Fig. 3
INVENTOR.
William Stelzer Patented May 8, 1945

2,375,392

UNITED STATES PATENT OFFICE 2,375,392

BRAKE

William Stelzer, Summit, N. J.

Application January 16, 1943, Serial No. 472,540

3 Claims. (Cl. 188—78)

The invention relates to brakes and more particularly to a brake of the torque-reactive type where the friction members have no anchor point and where a rotatable actuating member is used to engage the friction members with the brake drum or wheel.

The improvement incorporates the principle of using the brake torque as a compensating force to obtain a braking effect that is in a pre-determined proportion to the braking effort. This principle is disclosed basically in my co-pending application Serial #462,067, filed October 15, 1942.

The object of the invention is to incorporate the principle in a simple construction that lends itself particularly for use with air or mechanical brakes where the actuating force must be transmitted through a rotating shaft.

Another object is to provide means for transmitting the brake torque from one shoe to the other, as well as novel means for equalizing the pressures between the friction surfaces and the brake drum.

Other objects and advantages of this invention will be apparent from the following detailed description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a diagrammatic side elevation of a brake built according to the novel principle, where the brake drum is shown in section to provide an unincumbered view of the brake construction;

Fig. 2, a diagrammatic side elevation showing the invention embodied in an external brake; and Fig. 3, a fragmentary side elevation of a modified form of the invention, where the lower portion may be similar to the illustration in Fig. 1.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

Referring now to Fig. 1, there is shown an embodiment incorporated in a wheel of an automotive vehicle where 1 represents the backing plate rigidly secured to the axle, and 2 the brake drum, which revolves with the wheel. Arranged near the brake drum are a pair of internal brake shoes 3 and 4 urged in a released position by retraction springs 5 to rest against stop pins 6 extending from backing plate 1. The toes 7 and 8 of the brake shoes engage the ends of a double armed lever or cam 9 having a shaft 10 revolvable in backing plate 1. A lever 11 extends from shaft 10 to be engaged by a brake rod 12 actuated by a brake pedal 13 operatable by the operator, whereby depression of pedal 13 turns double armed lever 10. Lever 11 may also be connected to a rod 14 leading to a conventional expansible chamber motor mechanism 15 controlled by fluid pressure means.

In contrast to conventional brakes the brake shoes 3 and 4 have no fixed anchor point. The shoes are merely linked together by means of toggle links 16 and 16' pivotally joined together at 17 to form a knee which can slide on plate 18 secured to backing plate 1. Due to this construction the torque reaction is taken up entirely by lever 9 and transmitted to shaft 10 and the backing plate.

In Fig. 2 the principle is applied to an external type brake having a brake drum or brake wheel 19 around which is wrapped a brake band 20 pivoted at 21 to a double armed lever 22 turning on a fixed anchor stud 23, operated by a rod 24 which may be the equivalent of rod 12 or 14. A connecting rod 25 links lever 22 and the other end of shoe 20 so that when rod 24 is pulled to the right the shoe is engaged with the drum. In order to limit the self-energizing effect of the band, it is preferable to give it certain rigidity which gives it a tendency to unwrap.

Fig. 3 shows a modification pertaining to an internal brake, similar to Fig. 1.

In place of shaft 10 there is shown a fixed anchor stud 26 extending from backing plate 27, serving as a fulcrum for lever 28 actuated by a fluid motor mechanism consisting of a piston 29 and a cylinder 30 in connection with the conventional brake line 31 leading to the master cylinder or the like. Actuator lever 28 is pivotally connected with shoes 32 and 33 by means of links 34 and 35.

In operation, supposing that the operator depresses brake pedal 13 he thereby actuates double armed lever 9 in a clockwise rotation to expand the brake shoes until they press against the brake drum. Assuming that the latter ordinarily revolves in a direction indicated by arrow 36, the brake torque or drag due to the friction between the shoes and the drum is transmitted to lever 9 where the end 8 contacts it. The upper extremity of shoe 3 is the energizing end from where the brake torque builds up. The brake torque acting at 8 depends on the comparatively small force acting at 7, and is greatly increased due to the self-energizing action of the shoes, which in turn depends on the coefficient of friction of the brake shoes. By inspection of the drawing it becomes apparent that the brake torque causes a reaction opposing the depression of the brake pedal. Thus the greater the brake torque, the greater must be the manual pressure on pedal 13 to maintain that brake torque. This is a very desirable feature because it provides "pedal feel" where the operator is fully aware of and has perfect control over the effect of the brakes.

The novel arrangement makes it impossible that the brake may grab, i. e., that a great brake torque is produced despite a light pedal pressure, because the shoes have no fixed anchor point. This may be illustrated by assuming that the brake torque is momentarily too great. The increased reaction opposing the depression of pedal 13 causes the latter to yield so that lever 9 turns in a counterclockwise rotation, the brake shoes being able to rotate with drum 2 a short distance. Since lever 9 turns counterclockwise and shoe 3 moves away from it, the pressure of lever 9 on shoe 3 is reduced, resulting in a reduction of friction between the shoes and the drum, and consequently a reduction of the brake torque. It is apparent that the reduction of the brake torque only takes place while it exceeds the inherent ratio of pedal pressure to brake torque, and since the brake torque may be changed merely by changing the pressure between lever 9 and tip 7, it may be seen that the movement necessary is a minimum and is not noticeable by the operator.

The brake torque produced by shoe 3 is transmitted through links 16 and 16' to shoe 4 to press the latter with increased force against the drum. While this type of self-actuation provides ease of application, it causes uneven wear of the shoes because the pressure between the shoe and the drum increases as the brake torque increases; thus the wear is greater where the torque is transmitted to lever 9, and smallest where the shoe is first applied. To prevent this uneven wear I provide the means as shown in the drawing. The principle is to increase the radial pressure where the torque is small, and to reduce it where the torque is great. Links 16 and 16' not only transmit the torque from one shoe to the other but they also produce a resultant force opposing the radial pressure between the brake lining and the drum. Lever 9 is arranged in such a way that when it is applied the flat surfaces engaging the shoes form an oblique line with respect to a radial line drawn through the center of shaft 10. Due to this obliquity the outward radial force of the shoe 3 at its upper end is increased and on shoe 4 it is decreased.

While the elements may be arranged as described to provide even wear of the brake shoes, the benefit is obtained only when the drum rotates as indicated by arrow 36. However, since this may be the rotation of the wheel during forward travel of the vehicle, the wear of the shoes while the vehicle is backing up is of no consequence.

Supposing that the operator releases the foot pressure on the pedal, the torque acting through tip 8 against lever 9, as well as the force of return springs 5 urge the shoes and the actuating elements into a released position as shown in Fig. 1.

The operation of the construction shown in Fig. 3 is similar to that described for Fig. 1. The actuation being hydraulical, a pressure produced in brake line 31 moves piston 29 to turn lever 28 in a clockwise direction, whereby the links 34 and 35 transmit the force of application to the brake shoes. Link 35 receives the brake torque, and 34 energizes shoe 32. The two links mentioned are arranged to produce the same result as the obliquity of the contact surfaces of lever 9, whereby the upper end of shoe 32 is urged with increased force against the drum, and the brake torque from shoe 33 is transmitted through link 35 to produce a force component that urges a decrease of pressure between the upper end of shoe 33 and the drum.

The operation of the modified construction shown in Fig. 2 is self-explanatory. The normal direction of rotation of the drum where the linings wear most evenly is indicated by arrow 37.

Having thus described my invention, I claim:

1. In a brake, a fixed backing plate, a revolving brake drum, a pair of brake shoes circumferentially arranged near said brake drum, a toggle joint between two adjacent ends of said brake shoes to transmit the brake torque from one shoe to the other, the knee of said toggle joint sliding on a surface extending from said backing plate, said knee pointing outwardly whereby the radial pressure of said brake shoes near said toggle joint is reduced when torque is transmitted, a double armed lever intermediate the other two adjacent ends of said brake shoes, the fulcrum of said lever being in fixed relation to said backing plate, one arm of said lever being operatively connected to the end of one brake shoe to urge it against said brake drum, and the other arm of said lever being connected to the adjacent end of the other brake shoe to receive the brake torque, and means to operate said double armed lever.

2. The construction as claimed in claim 1, where said means to operate said double armed lever comprises a hydraulic wheel cylinder operable by hydraulic fluid.

3. In a brake, a fixed backing plate, a revolving brake drum, a pair of brake shoes circumferentially arranged near said drum, a joint between two adjacent ends of said brake shoes to transmit the brake torque from one shoe to the other, a double armed lever intermediate the other two adjacent ends of said brake shoes, the fulcrum of said lever being in fixed relation to said backing plate, one arm of said lever being operatively linked to the energizing end of one brake shoe in a manner to urge it against said brake drum, and a link between the other arm of said lever and the torque transmitting heel of the brake shoe arranged in a manner to decrease the radial force of said shoe against said drum.

WILLIAM STELZER.